US010284054B2

(12) United States Patent
Suzuki

(10) Patent No.: US 10,284,054 B2
(45) Date of Patent: May 7, 2019

(54) MOTOR CONTROL DEVICE

(71) Applicant: ASMO CO., LTD., Kosai, Shizuoka-pref. (JP)

(72) Inventor: Hidenobu Suzuki, Kosai (JP)

(73) Assignee: DENSO CORPORATION, Aichi-Pref. (JP)

(*) Notice: Subject to any disclaimer, the term of this patent is extended or adjusted under 35 U.S.C. 154(b) by 698 days.

(21) Appl. No.: 14/830,739

(22) Filed: Aug. 20, 2015

(65) Prior Publication Data
US 2016/0056692 A1  Feb. 25, 2016

(30) Foreign Application Priority Data

Aug. 21, 2014 (JP) ................................. 2014-168440

(51) Int. Cl.
H02K 11/00 (2016.01)
H02K 29/08 (2006.01)

(52) U.S. Cl.
CPC ......... H02K 11/0021 (2013.01); H02K 29/08 (2013.01)

(58) Field of Classification Search
CPC . H04N 2201/04789; H04N 2201/0471; H04N 2201/04734; H04N 2201/04729; H04N 2201/04731
See application file for complete search history.

(56) References Cited

U.S. PATENT DOCUMENTS

| 6,586,902 B2 * | 7/2003 | Gotou | G11B 19/28 |
| | | | 318/139 |
| 2002/0109479 A1 * | 8/2002 | Kishibe | B60L 11/1807 |
| | | | 318/811 |

(Continued)

FOREIGN PATENT DOCUMENTS

| JP | 2000187931 A | * | 7/2000 | ............. G11B 19/26 |
| JP | 2000187931 A | * | 7/2000 | ............. G11B 19/26 |

(Continued)

OTHER PUBLICATIONS

English language translation of the following: Office action dated Feb. 20, 2018 from the JPO in a Japanese patent application No. 2014-168440 corresponding to the instant patent application. This office action translation is submitted now in order to supplement the understanding of the cited reference which is being disclosed in the instant Information Disclosure Statement.

*Primary Examiner* — Shawki S Ismail
*Assistant Examiner* — Zoheb S Imtiaz
(74) *Attorney, Agent, or Firm* — Solaris Intellectual Property Group, PLLC

(57) ABSTRACT

A motor control device is provided that enables smooth rotation control from a low-speed region to a high-speed region. A microcomputer of the motor control device calculates the rotation speed of a rotor from the time between edges that appear per 60° electrical angle at the time of starting the motor, from a signal that is output when a the hall sensor detects the magnetic field of a rotating rotor and, in conjunction with an increase in the rotation speed of the rotor, calculates the rotation speed of a rotor from the time between edges that appear at electrical angles that are larger than the electrical angle 60° in the signal, per 180° electrical angle, per 360° electrical angle, per 900° electrical angle, and per 1800° electrical angle.

7 Claims, 8 Drawing Sheets

(56) References Cited

U.S. PATENT DOCUMENTS

| | | | |
|---|---|---|---|
| 2003/0227287 A1* | 12/2003 | Hori | G01D 5/242 324/207.25 |
| 2005/0035675 A1* | 2/2005 | Yamaguchi | B60K 6/26 310/68 R |
| 2008/0203962 A1* | 8/2008 | Maeda | H02P 6/16 318/721 |
| 2010/0283416 A1* | 11/2010 | Onishi | H02P 6/18 318/400.09 |
| 2011/0043146 A1* | 2/2011 | Sato | H02P 6/12 318/400.04 |
| 2013/0300324 A1* | 11/2013 | Kaufmann | G01D 5/24452 318/400.04 |
| 2014/0035503 A1* | 2/2014 | Kawasumi | H02P 6/16 318/400.38 |
| 2014/0210379 A1* | 7/2014 | Kato | H02P 6/15 318/139 |
| 2016/0134073 A1* | 5/2016 | Tokizaki | H02K 5/145 310/71 |

FOREIGN PATENT DOCUMENTS

| | | |
|---|---|---|
| JP | 2001-112284 A | 4/2001 |
| JP | 4715043 B2 | 7/2011 |
| JP | 5194545 B2 | 5/2013 |

* cited by examiner

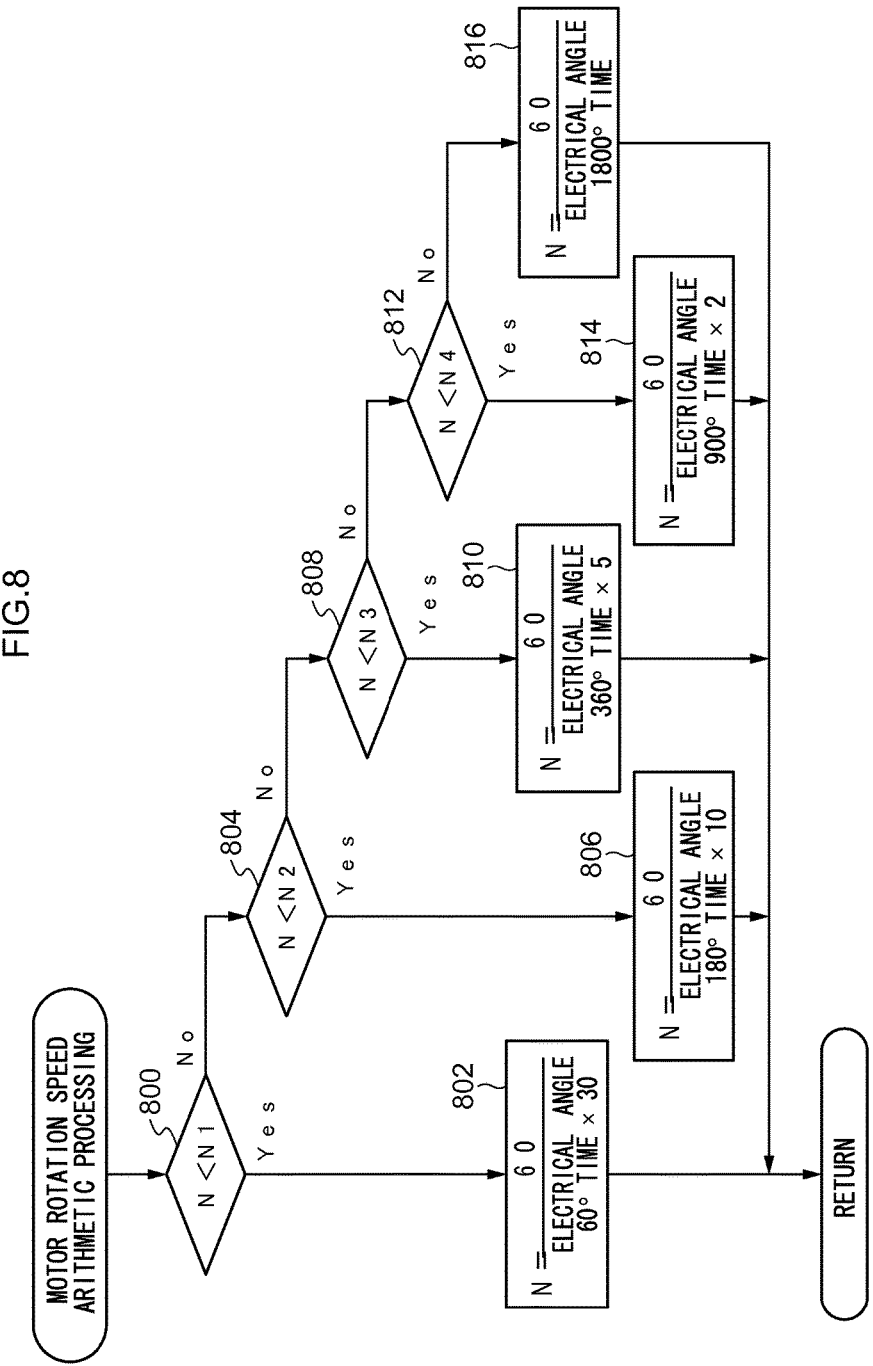

MOTOR CONTROL DEVICE

CROSS-REFERENCE TO RELATED APPLICATION

This application claims priority under 35 USC 119 from Japanese Patent Application No. 2014-168440 filed Aug. 21, 2014, the disclosure of which is incorporated by reference herein.

BACKGROUND

Field of the Invention

The present invention relates to a motor control device.

Related Art

A control device for a brushless DC motor (abbreviated below as a "motor") calculates the actual rotation speed of a rotor based on the magnetic field of permanent magnets that configure the rotor of a motor, detected using a the hall sensor or the like. By feeding back the detected actual rotation speed using a Proportional-Integral Controller (PI Control) or the like, motor rotation control is performed in consideration of the actual rotation speed.

Further, there are various configurations for the rotors provided at a motor, such as a two-, four-, six-, eight- or ten-pole configuration, according to the number of poles of the permanent magnets and, in general, a larger number of poles results in smoother motor rotation. As one example, a blower motor used for blowing in a vehicle air conditioning unit uses a ten-pole rotor configured of five S-poles and five N-poles.

In a motor provided with a ten-pole rotor, the S-pole magnetic field and the N-pole magnetic field are each detected five times during one rotation of the rotor. By using the magnetic fields of the S-poles and N-poles that are detected a total of thirty times by the hall sensor U for the U phase, the hall sensor V for the V phase and the hall sensor W for the W phase, detected per 60° in terms of the electrical angle, during one rotation of the rotor, the rotation of the rotor can be detected in small steps and calculation of the rotation speed of the rotor during low-speed rotation is facilitated.

However, when the rotation speed of the rotor is a high speed, the cycles for detecting the magnetic field are reduced in time, so inaccuracies in rotation speed calculation may occur as a result of errors in magnetic field detection. Further, there has been a problem, when the above-described PI control is performed using a rotation speed that has been inaccurately calculated, there is a tendency for hunting to occur, whereby motor rotation becomes irregular. Errors in magnetic field detection originate, for example, from errors in assembly of the the hall sensor U, the hall sensor V and the hall sensor W, and the influence thereof in rotation speed calculation becomes larger as the rotor rotation speed increases.

U.S. Pat. No. 5,194,545 (Patent Document No. 1) discloses a control device for a brushless motor that calculates the rotation speed of a rotor during low-speed rotation based on changes in magnetic field per 60° of electrical angle and that also calculates the rotation speed of the rotor during high-speed rotation based on changes in magnetic field per 360° of electrical angle.

However, the control device for a brushless motor described in Patent Document No. 1 does not calculate the rotation speed at an electrical angle between per 60° of electrical angle and per 360° of electrical angle. As a result, calculation of the rotation speed when the rotation speed of the rotor transitions from a low speed to a high speed becomes inaccurate, and there has been the problem whereby there is a tendency for the above-described hunting to occur in the motor rotation.

SUMMARY

In view of the foregoing, a motor control device that enables smooth rotation control from a low-speed region to a high-speed region is provided.

In order to address this problem, a motor control device according to a first aspect includes: a magnetic field detection section that detects a magnetic field of a permanent magnet rotating together with an output shaft of a motor, and that outputs a signal which is a rectangular wave in which an edge appears per a predetermined number of degrees of electrical angle in accordance with a change in the magnetic field; and a control section that calculates a rotation speed of the output shaft based on a time between adjacent edges in the signal at a time of starting of the motor, and that calculates the rotation speed of the output shaft based on a time between edges that appear in the signal per an electrical angle which is larger than the predetermined number of degrees of electrical angle when the rotation speed of the output shaft increases.

According to the motor control device of the first aspect, at the time of starting the motor, calculates the rotation speed of the output shaft by counting the time between edges (adjacent edges) that appears per (every) predetermined electrical angle. Further, this motor control device, when the rotation speed of the output shaft further increases (as further increasing in the rotation speed of the output shaft), calculates the rotation speed of the output shaft by counting the time between edges that appear per (every) electrical angle which is larger than the predetermined electrical angle.

The rotation speed can be accurately calculated by counting the time between edges that appear at per (every) small electrical angle in a low-speed region and by counting the time between edges that appear at per (every) larger electrical angle in a high-speed region and, as a result, smooth rotation control of the motor is possible from a low-speed region to a high-speed region.

In a motor control device according to a second aspect in the motor control device of the first aspect, the control section calculates the rotation speed of the output shaft based on a time between edges that appear in the signal per a first electrical angle which is larger than the predetermined number of degrees of electrical angle when the rotation speed of the output shaft is a first rotation speed (is in a first rotation speed range), and that calculates the rotation speed of the output shaft based on a time between edges that appear in the signal per a second electrical angle which is larger than the first electrical angle when the rotation speed of the output shaft is a second rotation speed (is in a second rotation speed range) which is larger than the first rotation speed.

In a motor control device according to a third aspect in the motor control device of the first aspect or second aspect, the second electrical angle is an electrical angle that corresponds to one rotation of the output shaft, and the first electrical angle has a size that is between the predetermined number of degrees of electrical angle and the second electrical angle.

It is possible that plural different first electrical angles are set, which have sizes that are between the predetermined electrical angle and the second electrical angle.

According to the motor control device of the second aspect and the third aspect, the rotation speed can be accurately calculated at a low-speed region and up to a high-speed region by, as further increasing in the rotation speed, calculating the rotation speed of the output shaft by counting the time between edges, respective "the between edges", in which the time is counted, correspond to incrementally larger electrical angles than the predetermined electrical angle (the first electrical angle and the second electrical angle). As a result, smooth rotation control of the motor is possible from a low-speed region to a high-speed region.

In a motor control device according to a fourth aspect in the motor control device of any one of the first to the third aspects, the first electrical angle has a size that is an integral multiple of the predetermined number of degrees of electrical angle.

According to the motor control device of the fourth aspect, since the first electrical angle(s) (one first electrical angle or plural different first electrical angles) applied when further increasing in the rotation speed is(are) the integral multiple (for example, triple, six times, nine times and the like) of the predetermined electrical angle, the time between edges in the signal can be calculated as an integral multiple of the time between edges that are separated with the predetermined angle.

In a motor control device according to a fifth aspect in the motor control device of any of the first to fourth aspects, the motor is a brushless DC motor and three of the magnetic field detection sections are provided, respectively corresponding to a U phase, a V phase and a W phase of the brushless DC motor.

According to the motor control device of the fifth aspect, by accurately calculating the rotation speed at a low-speed region and up to a high-speed region, the rotation of the brushless DC motor, which requires extremely precise rotation speed control, can be smoothly controlled.

BRIEF DESCRIPTION OF THE DRAWINGS

Exemplary embodiments of the invention will be described in detail with reference to the following figures, wherein:

FIG. 8 is a flow chart showing one example of motor rotation speed arithmetic processing for the motor control device according to an exemplary embodiment.

DETAILED DESCRIPTION

Figure 1:
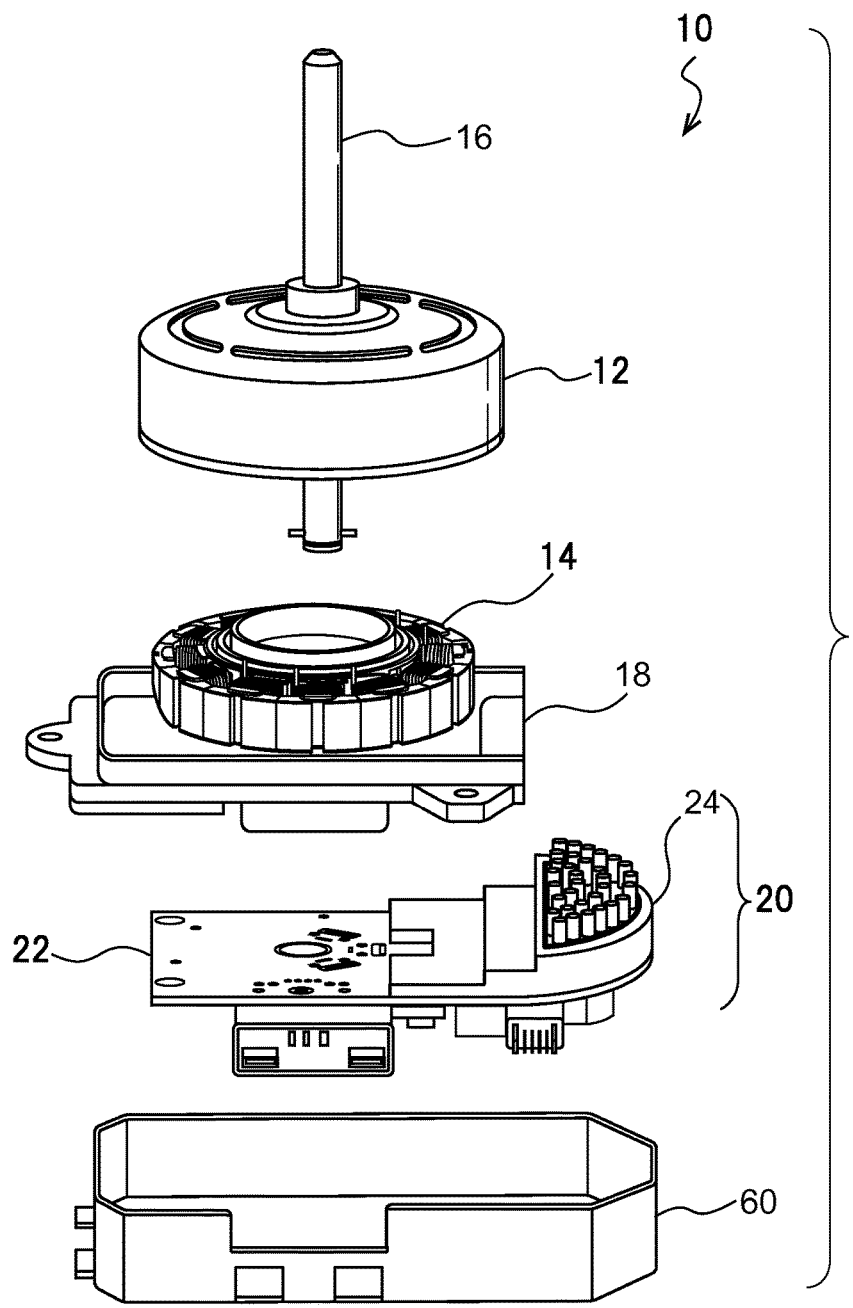
FIG. 1 is a schematic view showing the configuration of a motor unit using the motor control device according to an exemplary embodiment.

FIG. 1 is a schematic view showing the configuration of a motor unit 10 using a motor control device 20 according to the present exemplary embodiment. The motor unit 10 according to the present exemplary embodiment of FIG. 1 is a unit of a blower motor that is used, for example, for blowing (air-feeding) in a vehicle air conditioning unit.

The motor unit 10 according to the present exemplary embodiment relates to a three-phase motor with an outer rotor structure in which a rotor 12 is provided at an outer side of a stator 14. The stator 14 is an electromagnet having conductive wire wound around a core member, and is configured by the three phases of a U phase, a V phase and a W phase. The U phase, V phase and W phase of the stator 14 respectively generate a revolving magnetic field as a result of the polarity of the magnetic field generated by the electromagnet being switched by the control of motor control device 20, as described below.

Rotor magnets (not shown in the drawings) are provided inside the rotor 12, and the rotor magnets cause the rotor 12 to rotate by corresponding to the revolving magnetic field generated at the stator 14. A shaft 16 is provided at the rotor 12 and rotates integrally with the rotor 12. While not shown in FIG. 1, a multi-blade fan such as a sirocco fan is provided at the shaft 16 in the present exemplary embodiment and, as a result of this multi-blade fan rotating together with the shaft 16, air-feeding is enabled in the vehicle air conditioning unit.

The stator 14 is mounted at the motor control device 20 via an upper case 18. The motor control device 20 is provided with a substrate 22 of the motor control device 20 and with a heat sink 24, which diffuses heat generated from elements on the substrate 22. A lower case 60 is attached to the motor unit 10, which is configured to include the rotor 12, the stator 14 and the motor control device 20.

Figure 2:
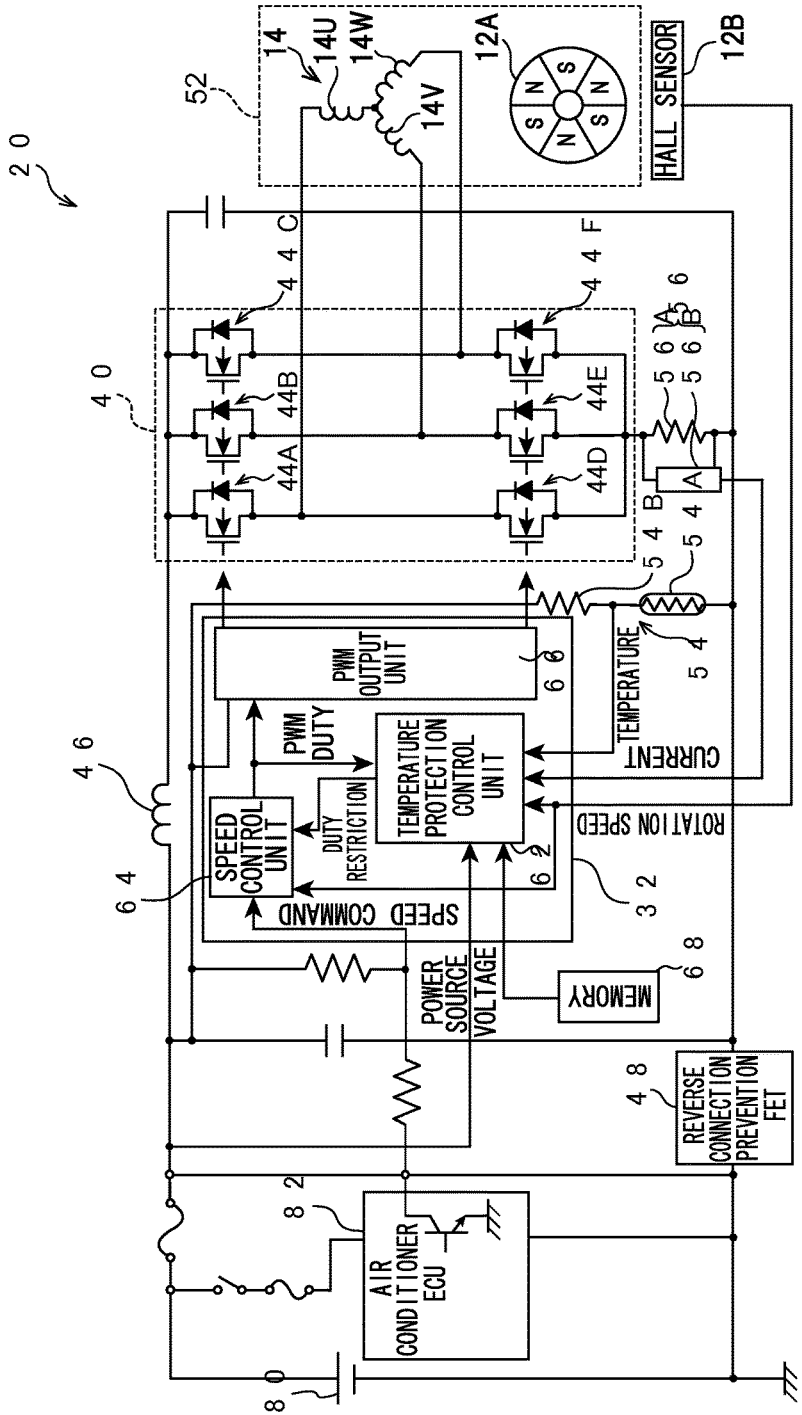
FIG. 2 is a view showing an outline of the motor control device according to an exemplary embodiment, and shows a case in which the rotor has six poles.

FIG. 2 is a view showing an outline of the motor control device 20 according to the present exemplary embodiment, and shows a case in which the rotor magnet 12A has six poles. An inverter circuit 40 switches the power supplied to the coils of the stator 14 of the motor 52. For example, inverter FETs 44A and 44D, inverter FETs 44B and 44E, and inverter FETs 44C and 44F perform switching of power supplied to a U phase coil 14U, a V phase coil 14V and a W phase coil 14W, respectively.

The respective drains of the inverter FETs 44A, 44B, 44C are connected to the positive pole of a vehicle mounted-battery 80 via a choke coil 46 for noise reduction. Further, the respective sources of the inverter FETs 44D, 44E, 44F are connected to the negative pole of a battery 80 via a reverse connection prevention FET 48.

In the exemplary present embodiment, a hall sensor 12B detects the magnetic field of a sensor magnet or the rotor magnet 12A mounted coaxially with the shaft 16. A microcomputer 32 detects the rotation speed and position (rotary position) of the rotor 12 based on the magnetic field detected by the hall sensor 12B, and performs control of the switching of the inverter circuit 40 in accordance with the rotation speed and the rotary position of the rotor 12. In addition, while not shown in FIG. 2, the hall sensor 12B includes a hall sensor U, a hall sensor V and a hall sensor W, which detect the magnetic field of the rotor magnet 12A or the sensor magnet corresponding to the U phase coil 14U, the V phase coil 14V and the W phase coil 14W of the stator 14, respectively. the hall sensor U, the hall sensor V and the hall sensor W are respectively mounted, for example, at intervals of 120° around a base part of the shaft 16.

The microcomputer 32 is input with control signals that include a speed command value related to the rotation speed of the rotor 12, from an air conditioner ECU 82, which controls the air conditioning in accordance with switch operation of the air conditioner. Further, a voltage divider circuit 54, which is configured by a thermistor 54A and a resistor 54B, and a current sensor 56, which is provided between inverter the circuit 40 and the negative pole of the battery 80, are connected to the microcomputer 32.

Since the resistance value of the thermistor 54A, which configures the voltage divider circuit 54, changes in accordance with the temperature of the substrate 22 of the circuit, the voltage of the signal output by the voltage divider circuit 54 changes in accordance with the temperature of the substrate 22. The microcomputer 32 calculates the temperature of the substrate 22 based on changes in the voltage of the signal output from the voltage divider circuit 54. In the present exemplary embodiment, for convenience, the signal output from the voltage divider circuit 54 is taken to be a signal based on detection results of the thermistor 54A. Further, in the present exemplary embodiment, the temperature of the substrate 22 of the circuit calculated based on detection results of the thermistor 54A is taken to be the temperature of the substrate 22 of the circuit detected by the thermistor 54A.

The current sensor 56 has, for example, a shunt resistor 56A and an amplifier 56B, which amplifies the potential difference of both ends of the shunt resistor 56A. The microcomputer 32 calculates the current of the inverter circuit 40 based on a signal output by the amplifier 56B.

In the present exemplary embodiment, the signal from the thermistor 54A, the signal output by the current sensor 56, and the signal output by the hall sensor 12B are input to a temperature protection control unit 62 inside the microcomputer 32. The temperature protection control unit 62 calculates the temperature of the elements of the substrate 22, the current of the inverter circuit 40, the rotation speed of the rotor 12, and the like based on the respective input signals. Further, the battery 80, which is a power source, is connected to the temperature protection control unit 62, and the temperature protection control unit 62 detects the voltage of the battery 80 as the power source voltage.

The control signal from the air conditioner ECU 82 is input to the speed control unit 64 inside the microcomputer 32. The speed control unit 64 is also input with a signal output by the hall sensor 12B. The speed control unit 64 calculates a duty ratio for Pulse Width Modulation (PWM) control related to control of the switching of the inverter circuit 40, based on the control signal from air conditioner ECU 82 and the rotation speed and the rotary position of the rotor 12 based on the signal from the hall sensor 12B.

A signal indicating the duty ratio calculated by the speed control unit 64 is input to the PWM output unit 66 and to the temperature protection control unit 62. The temperature protection control unit 62 corrects the duty ratio calculated by the speed control unit 64 based on the temperature of the substrate 22, the rotation speed of the rotor 12 and the load of the circuit of the motor control device 20, and feeds it back to the speed control unit 64. The load on the circuit is, for example, the duty ratio of the voltage generated by the inverter circuit 40, the current of inverter circuit 40, or the power source voltage. In the present exemplary embodiment, the duty ratio of the voltage produced by the inverter circuit 40 is the same as the duty ratio of the voltage that the inverter circuit 40 is caused to produce by the PWM output unit 66. As shown in FIG. 2, a signal indicating the duty ratio of the voltage that inverter circuit 40 is caused to produce by the PWM output unit 66 is also input to the temperature protection control unit 62.

Further, a memory 68, which is a storage device, is connected to the temperature protection control unit 62. Programs and the like related to calculation of the rotation speed of the rotor 12, for example, are stored at the memory 68.

The speed control unit 64 feeds back the correction made by the temperature protection control unit 62 to the duty ratio that it calculated itself by means, for example, of a Proportional Integral Controller (PI Controller), and outputs a signal, indicating the duty ratio that has been subjected to this feedback, to the PWM output unit 66. The PWM output unit 66 controls the switching of the inverter circuit 40 so as to produce the voltage of the duty ratio indicated by the input signal.

Figure 3:
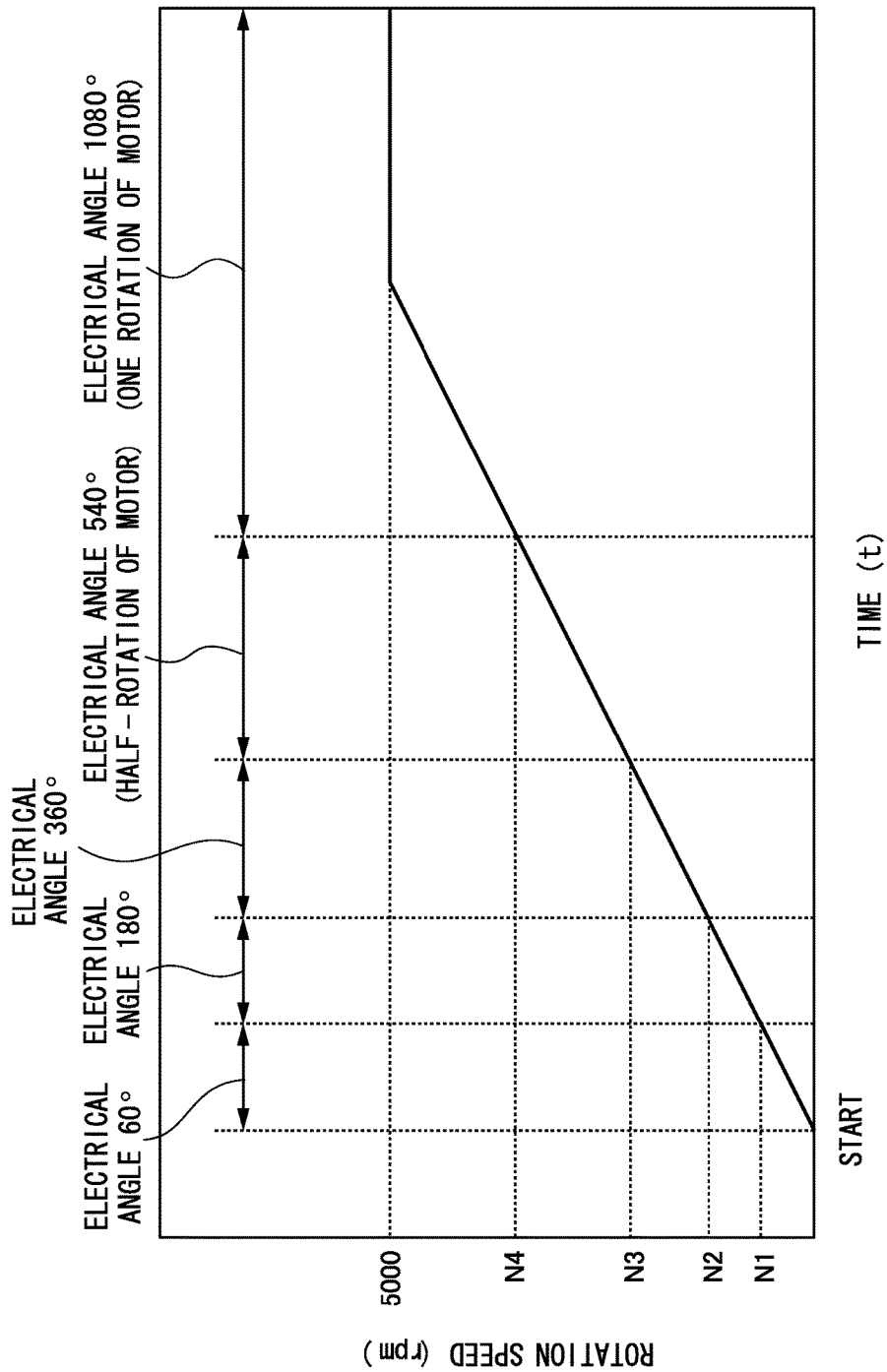
FIG. 3 is a schematic view showing one example of a relationship between the rotation speed of a six-pole rotor of the motor control device according to an exemplary embodiment and cycles of signal sampling of rotation speed calculation.

FIG. 3 is a schematic view showing one example of a relationship between the rotation speed of the rotor 12 of the motor control device 20 according to the present exemplary embodiment and cycles (periods) of signal sampling of rotation speed calculation. In the present exemplary embodiment, in a case of low speed where the rotation speed is less than N1, immediately after starting (activating) of the motor, the rotation speed of the rotor 12 is calculated by sampling the signal from the hall sensor 12B per (every) 60° electrical angle. Further, the respective signals are sampled per (every) 180° electrical angle in a case of the rotation speed of the rotor 12 being more than or equal to N1 and less than N2, per (every) 360° electrical angle in a case of the rotation speed of the rotor 12 being more than or equal to N2 and less than N3, per (every) half-rotation of the rotor 12 in a case of the rotation speed of the rotor 12 being more than or equal to N3 and less than N4, and per (every) one rotation of the rotor 12 in a case of the rotation speed of the rotor 12 being more than or equal to N4.

Since the rotor magnet 12A has six poles in the case of FIG. 3, the electrical angle is 540° when the rotor 12 performs a half-rotation and the electrical angle is 1040° when the rotor 12 performs one rotation.

Further, as an example, rotation speed N1 is 400 rpm, rotation speed N2 is 650 rpm, rotation speed N3 is 1300 rpm and rotation speed N4 is 2500 rpm.

Figure 4:
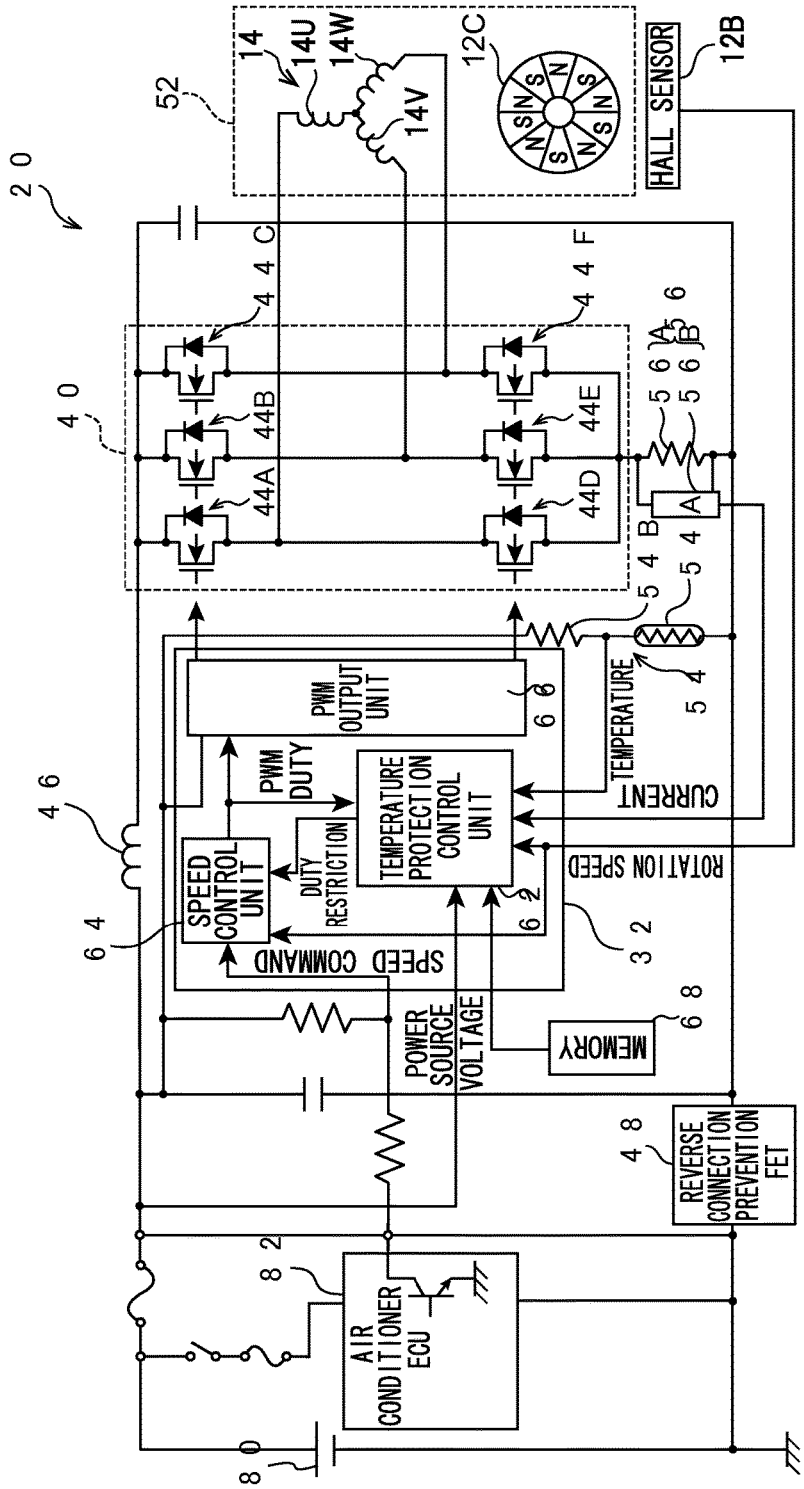
FIG. 4 is a view showing an outline of the motor control device according to an exemplary embodiment, and shows a case in which the rotor has ten poles.

FIG. 4 is a view showing an outline of a motor control device 120 according to the present exemplary embodiment, and shows a case in which a rotor magnet 12C has ten poles. Since the other of the configuration is similar to the case of FIG. 2, the same reference numerals are assigned for the configuration other than the rotor magnet 12C, and explanation thereof is omitted.

Figure 5:
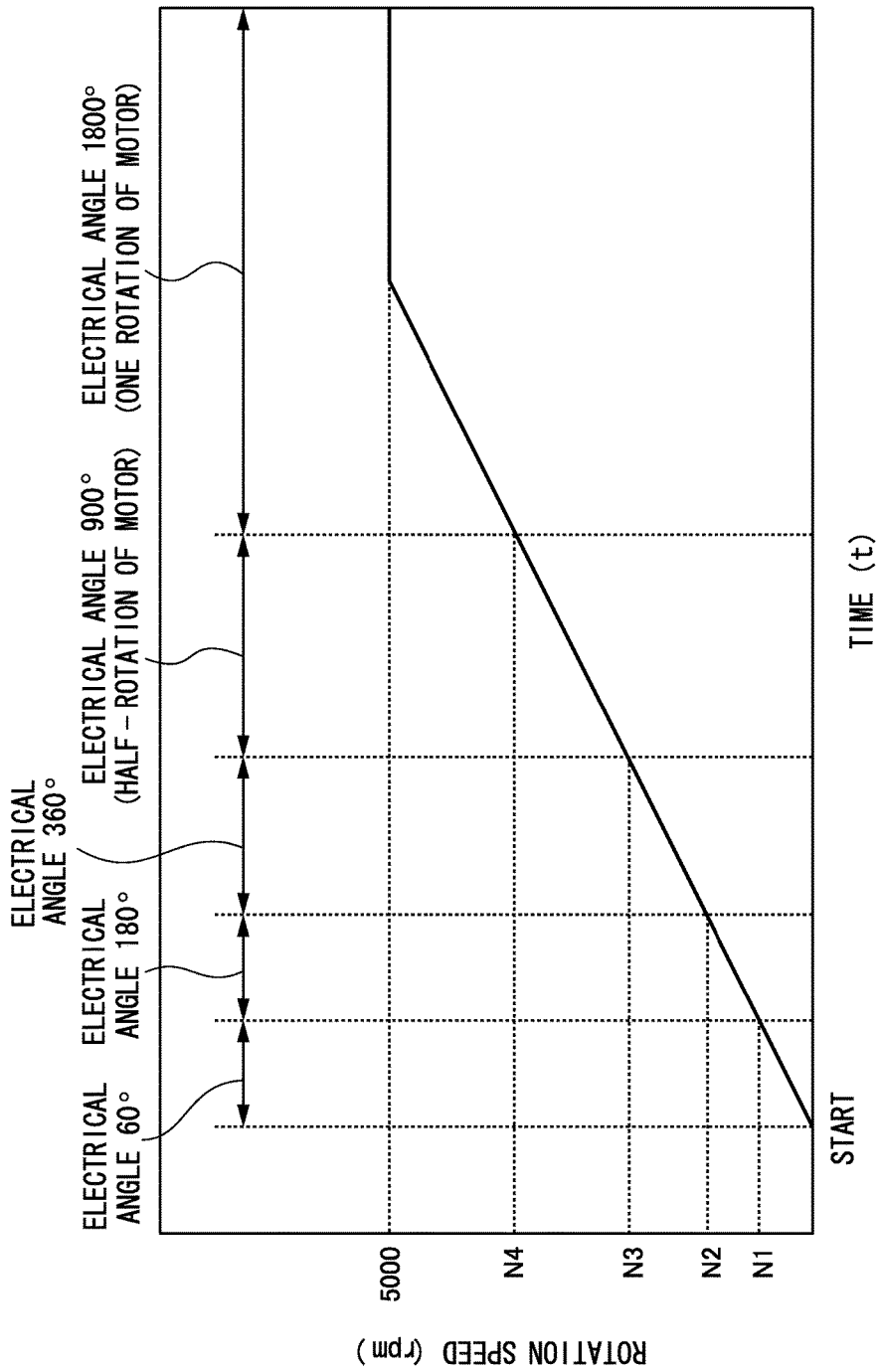
FIG. 5 is a schematic view showing one example of a relationship between the rotation speed of a ten-pole rotor of the motor control device according to an exemplary embodiment and cycles of signal sampling of rotation speed calculation.

FIG. 5 is a schematic view showing one example of a relationship between the rotation speed of the rotor 12 of the motor control device 120 according to the present exemplary embodiment and cycles (periods) of signal sampling of rotation speed calculation. In the case of FIG. 5, similarly to the case of FIG. 3, in a case of low speed where the rotation speed is less than N1, immediately after starting (activating) of the motor, the rotation speed of the rotor 12 is calculated by sampling the signal from the hall sensor 12B per 60° electrical angle. Further, the respective signals are sampled per 180° electrical angle in a case of the rotation speed of the rotor 12 being more than or equal to N1 and less than N2, per 360° electrical angle in a case of the rotation speed of the rotor 12 being more than or equal to N2 and less than N3, per half-rotation of the rotor 12 in a case of the rotation speed of the rotor 12 being more than or equal to N3 and less than N4, and per one rotation of the rotor 12 in a case of the rotation speed of the rotor 12 being more than or equal to N4.

Since the rotor magnet 12C has ten poles, the electrical angle is 900° when the rotor 12 performs a half-rotation and the electrical angle is 1800° when the rotor 12 performs one rotation.

Further, as an example, rotation speed N1 is 250 rpm, rotation speed N2 is 400 rpm, rotation speed N3 is 800 rpm and rotation speed N4 is 1500 rpm.

Figure 6:
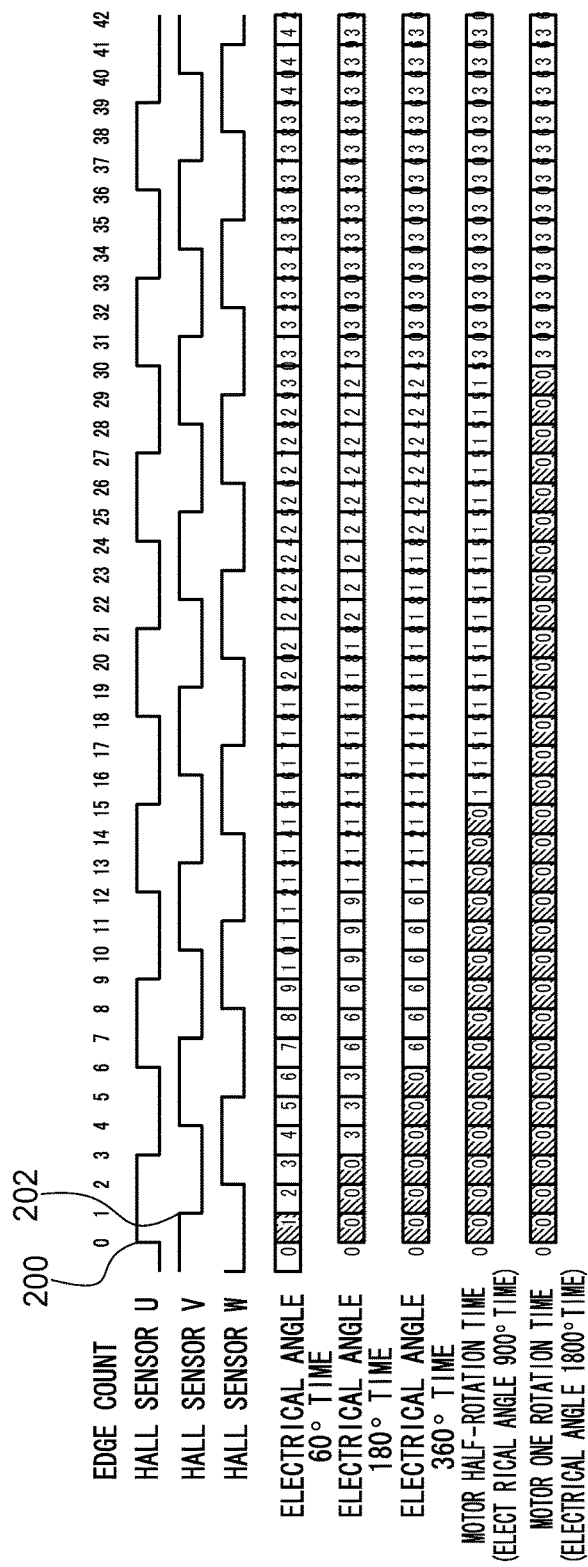
FIG. 6 is a schematic view showing signals output by the hall sensors and cycles of sampling for each of an electrical angle of 60°, an electrical angle of 180°, an electrical angle of 360°, an electrical angle of 900°, and an electrical angle of 1800°, in a motor control device of a motor having a ten-pole rotor.

FIG. 6 is a schematic view showing signals output by the hall sensors and cycles of sampling for each of an electrical angle of 60°, an electrical angle of 180°, an electrical angle of 360°, an electrical angle of 900°, and an electrical angle of 1800°, in the motor control device 120 of the motor having the ten-pole rotor magnet 12C.

The upper level of FIG. 6 indicates signals output by the hall sensor U, the hall sensor V and the hall sensor W, respectively. Since the hall sensors in the present exemplary embodiment digitalize signals by means of a circuit that converts an analog signal of, for example, a Schmitt trigger to a digital signal, the signals output by the hall sensor U, the hall sensor V and the hall sensor W, respectively, display a rectangular waveform in which a high-level signal and a low-level signal appear per 180°.

Further, since, as described above, the hall sensor U, the hall sensor V and the hall sensor W are respectively mounted at intervals of 120° around the output axis of the rotor 12, the phase of the signal output by the hall sensor W is delayed by 120° with respect to the signal output by the hall sensor U. Further, the phase of the signal output by the hall sensor V is delayed by 120° with respect to the signal output by the hall sensor W.

When sampling signals for rotation speed calculation per 60° electrical angle, edges that are separated at an interval of an electrical angle of 60° are detected in the signals output by each of the hall sensor U, the hall sensor V and the hall sensor W. In FIG. 6, after the appearance of an edge 200 in the signal of the hall sensor U, an edge 202, which is delayed from the edge 200 by an electrical angle of 60°, appears in the signal of the hall sensor V. In the present exemplary embodiment, by detecting these edges, signals for rotation speed calculation can be sampled per 60° electrical angle. In the present exemplary embodiment, the electrical angle of 60° is the predetermined electrical angle, and is the minimum unit of the interval between the edges that appear in the signals output by each of the hall sensor U, the hall sensor V and the hall sensor W.

In FIG. 6, an edge count is 0 when the edge 200 appears and then the edge count is 1 when the edge 202 appears. Thereafter, in FIG. 6, the edge count is raised by 1 per time an edge appears in the signals output by each of the hall sensor U, the hall sensor V and the hall sensor W.

When sampling signals for rotation speed calculation per 180° electrical angle, as shown in FIG. 6 as electrical angle 180° time, the signals output by the hall sensors are sampled each time the edge count, which is counted once per 60° electrical angle, is counted three times. Below, the respective signals are sampled, when sampling signals for rotation speed calculation per 360° electrical angle, the signals are sampled each time the edge count is counted six times; when sampling signals for rotation speed calculation per 900° electrical angle, the signals are sampled each time the edge count is counted fifteen times; and when sampling signals for rotation speed calculation per 1800° electrical angle, the signals are sampled each time the edge count is counted thirty times.

Further, as described above, an electrical angle of 60° is the minimum unit of the interval between the edges that appear in the signals output by each of the hall sensor U, the hall sensor V and the hall sensor W, and the above described electrical angle of 180°, electrical angle of 360°, electrical angle of 900°, and electrical angle of 1800° are each integral multiples of the predetermined electrical angle of 60°.

The rotation speed of the rotor 12 is calculated from the time between edges detected by the sampling. For example, in the case of sampling signals (edges) for rotation speed calculation per 60° electrical angle, rotation speed N (rpm) of the rotor 12 is calculated by using the following Equation (1), from electrical angle 60° time (s (second)), which is the time between edges that are separated by an electrical angle of 60°.

$$N=60/(\text{electrical angle } 60° \text{ time} \times 30) \quad (1)$$

Since the rotor magnet 12C has ten poles, when the electrical angle 60° time is multiplied by 30, the time required for the rotor 12 to make one rotation can be calculated in units of seconds. Further, since one minute is sixty seconds, the quotient obtained by dividing 60 by the time required for the rotor 12 to make one rotation is the rotation speed (rpm) of the rotor 12.

In the case of sampling signals for rotation speed calculation per 180° electrical angle, rotation speed N (rpm) of the rotor 12 is calculated by using the following Equation (2), from electrical angle 180° time (s), which is the time between edges that are separated by an electrical angle of 180°.

$$N=60/(\text{electrical angle } 180° \text{ time} \times 10) \quad (2)$$

In the case of sampling signals for rotation speed calculation per 360° electrical angle, rotation speed N (rpm) of the rotor 12 is calculated by using the following Equation (3), from electrical angle 360° time (s), which is the time between edges that are separated by an electrical angle of 360°.

$$N=60/(\text{electrical angle } 360° \text{ time} \times 5) \quad (3)$$

In the case of sampling signals for rotation speed calculation per 900° electrical angle, rotation speed N (rpm) of the rotor 12 is calculated by using the following Equation (4), from electrical angle 900° time (s), which is the time between edges that are separated by an electrical angle of 900°.

$$N=60/(\text{electrical angle } 900° \text{ time} \times 2) \quad (4)$$

In the case of sampling signals for rotation speed calculation per 1800° electrical angle, rotation speed N (rpm) of the rotor 12 is calculated by using the following Equation (5), from electrical angle 1800° time (s), which is the time between edges that are separated by an electrical angle of 1800°.

$$N=60/(\text{electrical angle } 1800° \text{ time}) \quad (5)$$

Figure 7A:
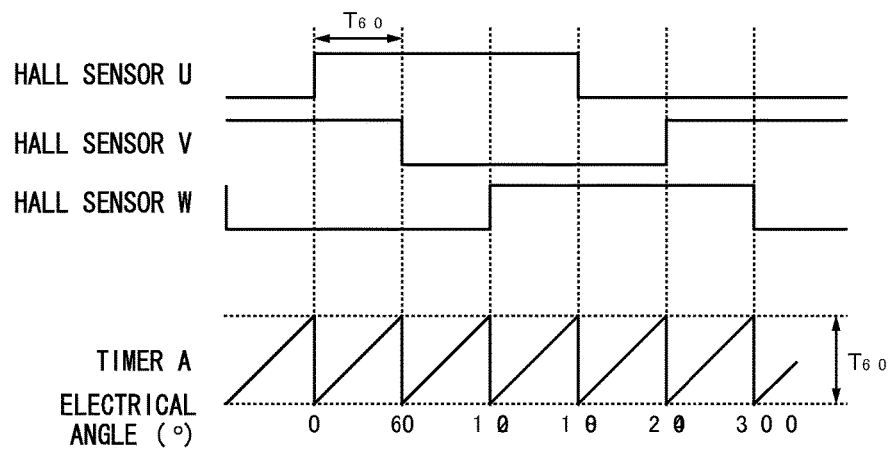
FIG. 7A is a schematic view showing one example of a case in which the time for an electrical angle of 60° is counted by counting, with timer A, a cycle in which an edge appears in signals output by the hall sensors U, V and W, in the motor control device according to an exemplary embodiment.

FIG. 7A is a schematic view showing one example of a case in which electrical angle 60° time $T_{60}$ is counted by counting, with a timer A, a cycle in which an edge appears in signals output from the hall sensors U, V and W, in the motor control device 120 according to the present exemplary embodiment. The timer A is, for example, a timer built into a microcomputer 32, which counts a base clock of the microcomputer 32 every 16 bits or 8 bits, and calculates the time by adding (integrating) the count value. As described above, the signals output by the hall sensors U, V and W appear an edge per 60° of electrical angle. When an edge appears in the signals output by the hall sensors U, V and W, the count of timer A is reset, and the value of the base clock being counted until the next edge appears in the signals output by the hall sensors U, V and W is taken as electrical angle 60° time $T_{60}$.

Figure 7B:
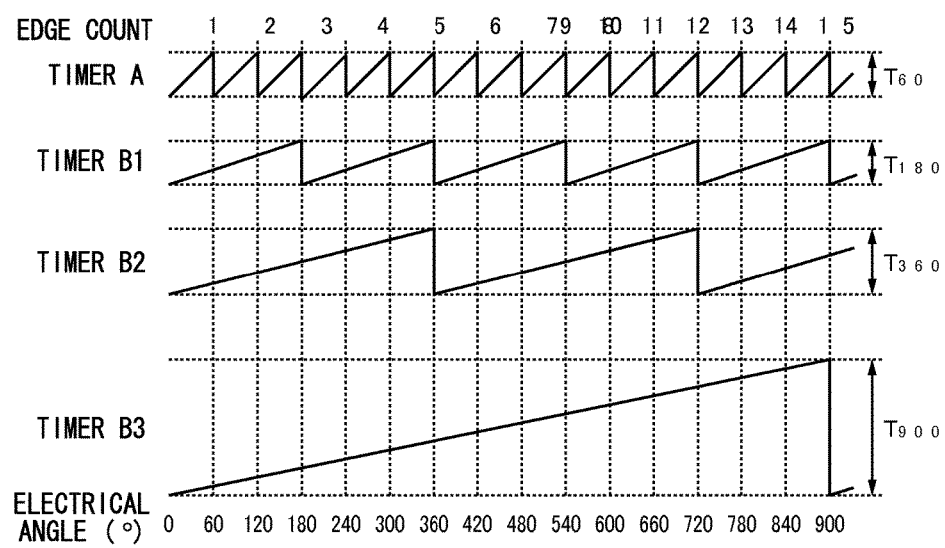
FIG. 7B is a schematic view showing one example of calculation by timers of the time for an electrical angle of 60°, the time for an electrical angle of 180°, the time for an electrical angle of 360°, and the time for an electrical angle of 900°.

FIG. 7B is a schematic view showing one example of calculation by timers of electrical angle 60° time $T_{60}$, electrical angle 180° time $T_{180}$, electrical angle 360° time $T_{360}$, and electrical angle 900° time $T_{900}$. Electrical angle 60° time $T_{60}$ is counted by timer A for per edge count, which is counted each time an edge appears in the signals output by the hall sensors U, V and W.

Electrical angle 180° time $T_{180}$ is calculated, using a timer B1 which is reset per three counts of the edge count, by counting the base clock until three counts of the edge count after the reset. The resetting of timer B1 and the starting of counting after the reset are performed by interrupt processing. In the present exemplary embodiment, when calculating electrical angle 180° time $T_{180}$, a program is set so as to generate an interrupt event per three counts of the edge count.

Electrical angle 360° time $T_{360}$ is calculated, using a timer B2 which is reset per six counts of the edge count, by counting the base clock until six counts of the edge count after the reset. In the present exemplary embodiment, when calculating electrical angle 360° time $T_{360}$, a program is set so as to generate an interrupt event per six counts of the edge count.

Electrical angle 900° time $T_{900}$ is calculated, using a timer B3 which is reset per fifteen counts of the edge count, by counting the base clock until fifteen counts of the edge count after the reset. In the present exemplary embodiment, when calculating electrical angle 900° time $T_{900}$, a program is set so as to generate an interrupt event per fifteen counts of the edge count.

While not shown in FIG. 7B, electrical angle 1800° time $T_{1800}$ is calculated, similarly to the above-described electrical angle 180° time $T_{180}$ and the like, using a timer that is reset per thirty counts of the edge count, by counting the base clock until thirty counts of the edge count after the reset. In the present exemplary embodiment, when calculating electrical angle 1800° time $T_{1800}$, a program is set so as to generate an interrupt event per thirty counts of the edge count.

Above, electrical angle 180° time $T_{180}$, electrical angle 360° time $T_{360}$, electrical angle 900° time $T_{900}$, and electrical angle 1800° time $T_{1800}$ are calculated using different timers to the timer A, which is used in the calculation of electrical angle 60° time $T_{60}$. However, electrical angle 180° time $T_{180}$, electrical angle 360° time $T_{360}$, electrical angle 900° time $T_{900}$, and electrical angle 1800° time $T_{1800}$ may be calculated by adding up multiples of the electrical angle 60° time $T_{60}$ calculated using timer A.

For example, electrical angle 180° time $T_{180}$ is calculated by adding three of electrical angle 60° time $T_{60}$, electrical angle 360° time $T_{360}$ by adding six of electrical angle 60° time $T_{60}$, electrical angle 900° time $T_{900}$ by adding fifteen of electrical angle 60° time $T_{60}$, and electrical angle 1800° time $T_{1800}$ by adding thirty of electrical angle 60° time $T_{60}$.

FIG. 8 is a flow chart showing one example of motor rotation speed arithmetic processing for the motor control device 120 according to the present exemplary embodiment. In a step 800, when starting the motor, rotation speed N is calculated using electrical angle 60° time $T_{60}$, it is determined whether or not the calculated rotation speed N is less than N1 shown in FIG. 5 and, in a case of an affirmative determination, the rotation speed is calculated using the above-described Equation (1) in a step 802 and the processing goes return.

In a case of a negative determination in the step 800, in a step 804 it is determined whether or not the motor rotation speed N is less than N2 shown in FIG. 5 and, in a case of an affirmative determination, the rotation speed is calculated using the above-described Equation (2) in a step 806 and the processing goes return.

In a case of a negative determination in the step 804, in a step 808 it is determined whether or not the motor rotation speed N is less than N3 shown in FIG. 5 and, in a case of an affirmative determination, the rotation speed is calculated using the above-described Equation (3) in the step 810 and the processing goes return.

In a case of a negative determination in the step 808, in a step 812 it is determined whether or not the motor rotation speed N is less than N4 shown in FIG. 5 and, in a case of an affirmative determination, the rotation speed is calculated using the above-described Equation (4) in a step 814 and the processing goes return. In a case of a negative determination in the step 812, the rotation speed is calculated using the above-described Equation (5) in a step 816 and the processing goes return.

As explained in the foregoing, in the present exemplary embodiment, the rotation speed of a motor can be accurately calculated by increasing the size of cycles for sampling edges from signals output by the hall sensors, according to increase in the motor rotation speed. As a result, it becomes possible to appropriately perform motor rotation control using a PI controller or the like, and smooth rotation control is enabled from a low-speed region to a high-speed region.

What is claimed is:

1. A motor control device, comprising:
  a magnetic field detection section that detects a magnetic field of a permanent magnet rotating together with an output shaft of a motor, and that outputs a signal which is a rectangular wave in which an edge appears per a predetermined number of degrees of electrical angle in accordance with a change in the magnetic field; and
  a control section that calculates a rotation speed of the output shaft; wherein
  in a case in which the rotation speed of the output shaft calculated by the control section is less than a first rotation speed, the control section calculates the rotation speed of the output shaft based on a time between edges that appear in said signal per the predetermined number of degrees of electrical angle,
  in a case in which the rotation speed of the output shaft calculated by the control section is more than or equal to the first rotation speed and less than a second rotation speed, the control section calculates the rotation speed of the output shaft based on a time between edges that appear in said signal per a first electrical angle which is larger than the predetermined number of degrees of electrical angle, the first electrical angle being obtained on the basis of counting of the edge appearing per the predetermined number of degrees of electrical angle in said signal a predetermined first time, and in a case in which the rotation speed of the output shaft calculated by the control section is more than or equal to the second rotation speed, the control section calculates the rotation speed of the output shaft based on a time between edges that appear in said signal per a second electrical angle which is larger than the first electrical angle, the second electrical angle being obtained on the basis of counting of the edge appearing per the predetermined number of degrees of electrical angle in said signal a predetermined second time larger than the predetermined first time.

2. The motor control device of claim 1, wherein the second electrical angle is an electrical angle that corresponds to one rotation of the output shaft, and the first electrical angle has a size that is between the predetermined number of degrees of electrical angle and the second electrical angle.

3. The motor control device of claim 2, wherein the first electrical angle has a size that is an integral multiple of the predetermined number of degrees of electrical angle.

4. The motor control device of claim 1, wherein:
the motor is a brushless DC motor, and
three of the magnetic field detection sections are provided, respectively corresponding to a U phase, a V phase and a W phase of the brushless DC motor.

5. The motor control device of claim 2, wherein:
the motor is a brushless DC motor, and
three of the magnetic field detection sections are provided, respectively corresponding to a U phase, a V phase and a W phase of the brushless DC motor.

6. The motor control device of claim 3, wherein:
the motor is a brushless DC motor, and
three of the magnetic field detection sections are provided, respectively corresponding to a U phase, a V phase and a W phase of the brushless DC motor.

7. The motor control device of claim 1, wherein the control section calculates the rotation speed of the output shaft based on a time between edges that appear in said signal per larger number of degrees of electrical angle stepwisely as the rotation speed of the output shaft increases.

* * * * *